No. 848,286. PATENTED MAR. 26, 1907.
T. R. BROWN.
TANK CAR.
APPLICATION FILED NOV. 15, 1906.

4 SHEETS—SHEET 1.

Witnesses
A. J. McCauley
Edgar T. Farmer

Inventor:
Thomas R. Brown
by
Bakewell Cornwell
Attys

No. 848,286. PATENTED MAR. 26, 1907.
T. R. BROWN.
TANK CAR.
APPLICATION FILED NOV. 15, 1906.

4 SHEETS—SHEET 2.

Witnesses
Edgar T. Farmer
A. J. McCauley

Inventor:
Thomas R. Brown
by Bakewell & Cornwall
Atty's

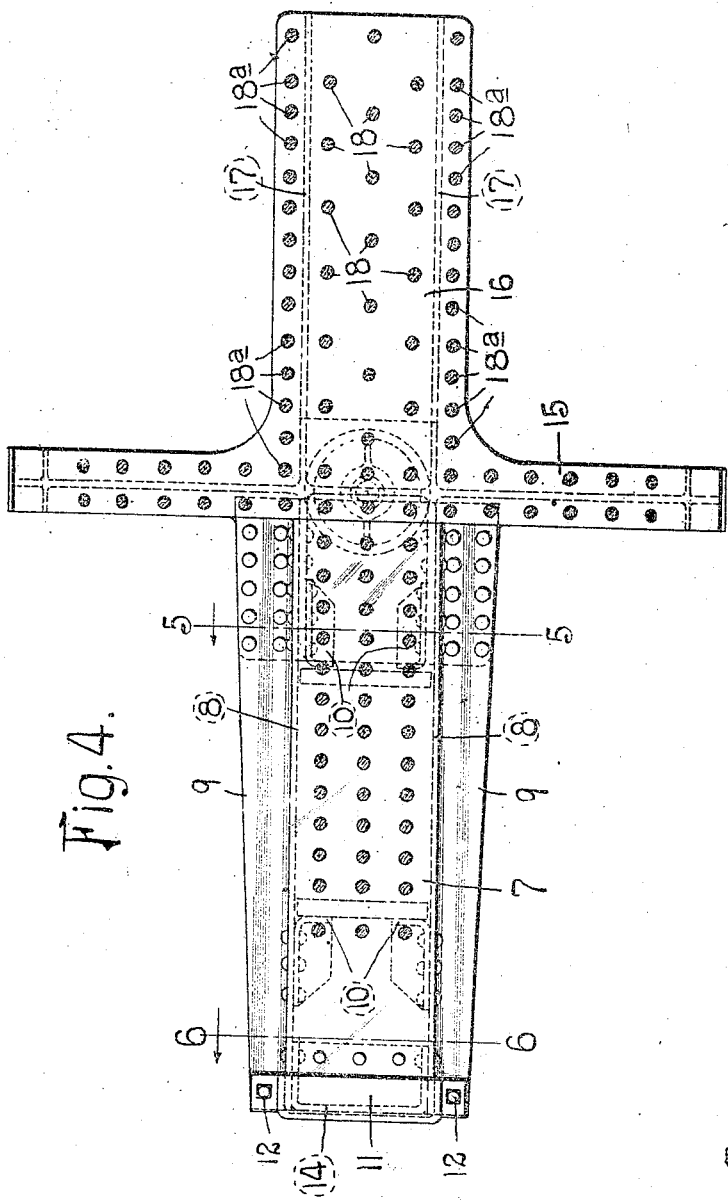
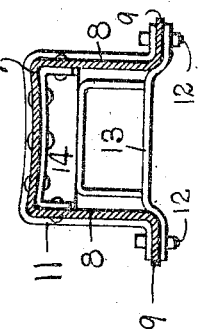
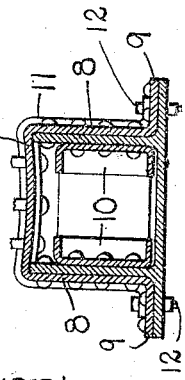

No. 848,286. PATENTED MAR. 26, 1907.
T. R. BROWN.
TANK CAR.
APPLICATION FILED NOV. 15, 1906.
4 SHEETS—SHEET 4.
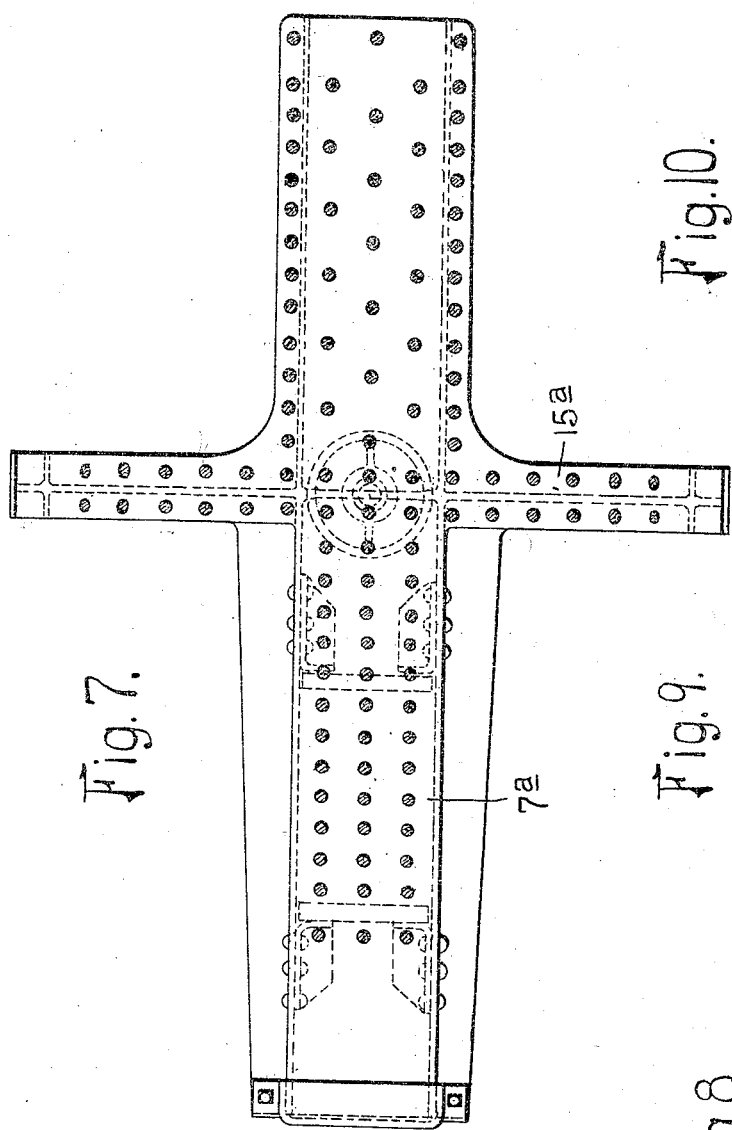
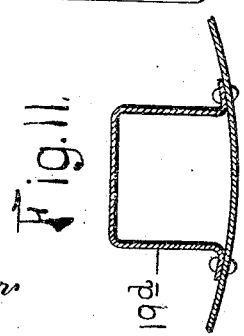
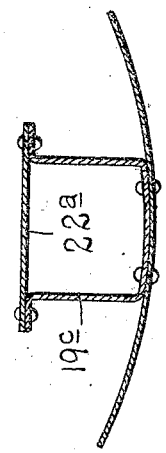
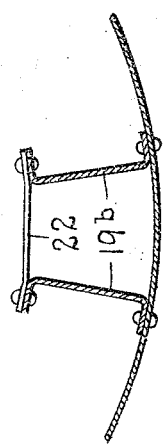
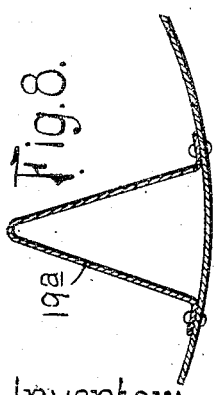
Witnesses
Edgar T. Farmer
A. J. McCauley
Inventor:
Thomas R. Brown
by Bakewell Cornwall Att'ys

UNITED STATES PATENT OFFICE.

THOMAS R. BROWN, OF NEW YORK, N. Y., ASSIGNOR TO AMERICAN CAR & FOUNDRY COMPANY, OF ST. LOUIS, MISSOURI, A CORPORATION OF NEW JERSEY.

TANK-CAR.

No. 848,286.   Specification of Letters Patent.   Patented March 26, 1907.

Application filed November 15, 1906. Serial No. 343,577.

*To all whom it may concern:*

Be it known that I, THOMAS R. BROWN, a citizen of the United States, residing at the city, county, and State of New York, have invented a certain new and useful Improvement in Tank-Cars, of which the following is a full, clear, and exact description, such as will enable others skilled in the art to which it appertains to make and use the same, reference being had to the accompanying drawings, forming part of this specification, in which—

Figure 1:
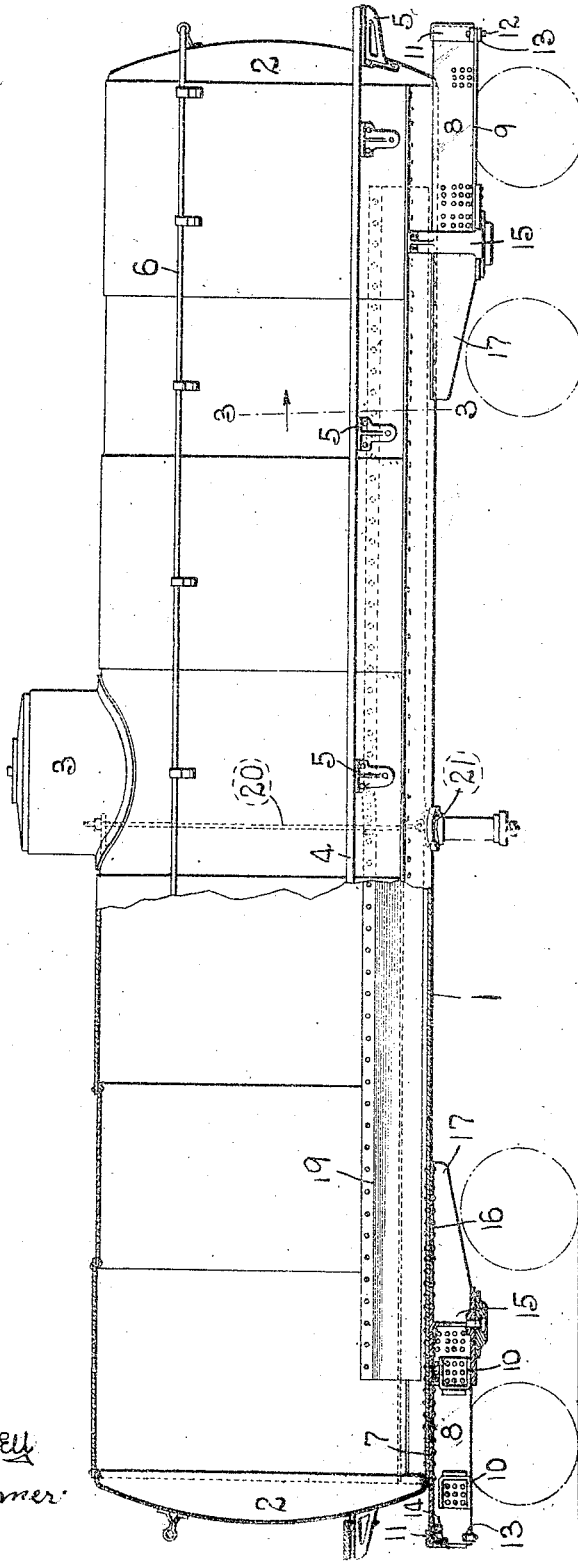
Figure 2:
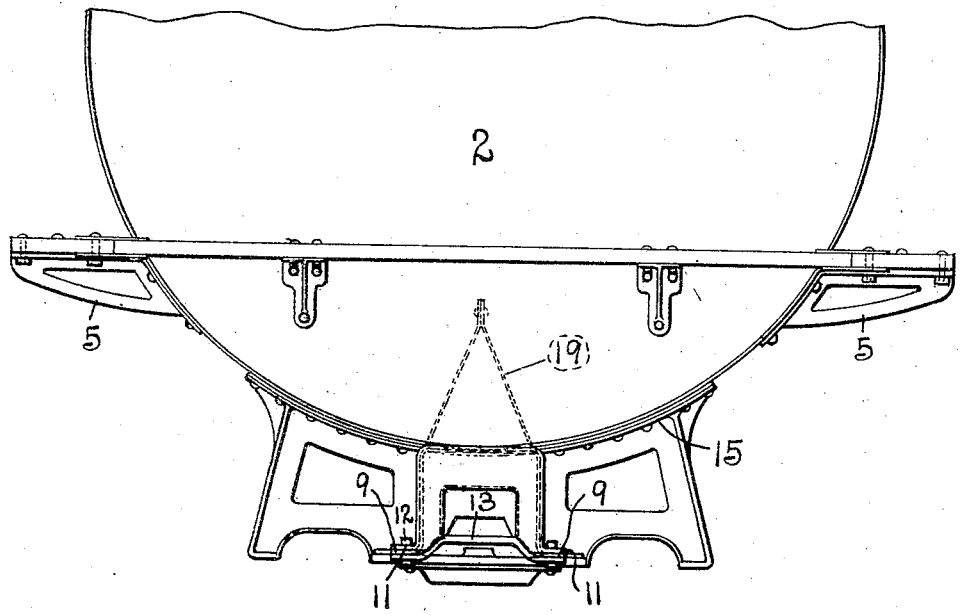
Figure 3:
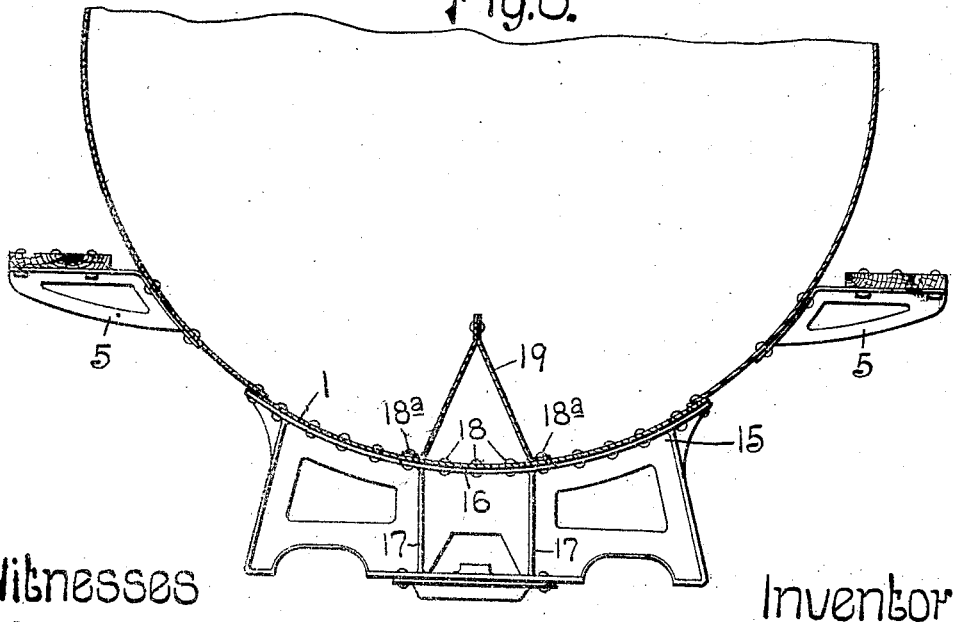

Figure 1 is a side elevational view, partly in section, of a tank-car constructed in accordance with my invention. Fig. 2 is an end elevation with a portion of the tank broken away. Fig. 3 is a sectional view taken on the line 3 3 of Fig. 1. Fig. 4 is a plan view of the body-bolster and draft-sill.
Fig. 5 is a sectional view taken on the line 5 5 of Fig. 4. Fig. 6 is a sectional view on the line 6 6 of Fig. 4. Fig. 7 illustrates a modified form of body-bolster and draft-sill. Figs. 8, 9, 10, and 11 illustrate modified forms of a tank-brace.

This invention relates to a new and useful improvement in tank-cars, the object being to provide a strong and simple tank-car at a very low cost.

In a car constructed in accordance with my invention center sills under the tank are replaced by a longitudinal tank-brace constituting an interiorly-arranged sill. This tank-brace receives the buffing and pulling stresses and stiffens the tank structure to such an extent that exterior center sills arranged between and directly connected to the body-bolsters are unnecessary.

Referring to the accompanying drawings, telescopically-arranged sheets form the top and sides of the tank, the lower edges of said sheets being secured to a bottom sheet 1, which preferably extends from end to end of the tank. Heads 2 are riveted to the ends of the tank. 3 indicates the usual filling-dome. The tank may be made of circumferentially-arranged sheets, if desired.

A running-board 4 surrounds the tank and is secured to brackets 5, which are riveted to the tank. The running-board brackets are sometimes subjected to shocks in service, which in the constructions employed prior to my invention would loosen or tear out the rivets that secured them to the tank, thereby causing leakage. In accordance with my invention these brackets are made of frangible material, preferably chilled cast-iron. In a construction of this character the rivets which secure the brackets to the tank are protected from violent shocks, as the brackets will break when subjected to a shock that would injure said rivets.

Hand-rails 6 are secured to the tank a suitable distance above the running-board.

Short draft-sills are riveted to the under side of the tank. These draft-sills are preferably formed of pressed metal comprising a curved top portion 7, depending webs 8, and bottom flanges 9. Draft-lugs 10 are secured to the webs 8. Any suitable draft-rigging may be arranged between these draft-lugs. In the drawings I have omitted the draft-rigging and draw-bar, as the same form no part of my present invention.

Buffer-blocks cover the outer ends of the draft-sills and are provided with suitable recesses to receive the draw-bar. Flanges 11 are formed integral with the buffer-blocks and conform to the shape of the draft-sills. These flanges rest on the draft-sills and are secured thereto by means of bolts 12, which also support a draw-bar-carrier iron 13. The buffer-blocks are reinforced by rigid pressed-metal members 14, which are riveted to the inside of the draft-sills.

In the preferred form of my invention the inner ends of the draft-sills are secured to body-bolsters 15 by means of rivets or bolts. These body-bolsters may be cast or made of pressed or rolled shapes, as desired.

Fig. 7 illustrates a modification in which the draft-sill 7ª and body-bolster 15ª are cast integral. The body-bolsters are provided with a curved top portion which conforms to the shape of the tank and is riveted thereto. Extensions, which comprise a curved top portion 16 and reinforcing-webs 17, are formed integral with the body-bolsters and secured to the tank by means of rivets 18 and 18ª, the rivets 18ª passing through a tank-brace 19, located inside of the tank.

The tank-brace 19, which is of approximately the same length as the tank, is composed of two plates arranged in the form of an inverted V riveted together at the top and provided with flanges at the bottom, which are riveted to the bottom of the tank. A suitable opening is formed in the top of this brace to allow a valve-operating rod 20 to extend from a discharge-valve 21 to the dome 3.

The buffing and pulling stresses are transmitted to the tank-brace 19 from the draft-sills and body-bolsters without exposing the tank structure to injurious shocks.

The tank-car herein shown may be compared to a beam supported at its ends, the weight of the tank and its contents acting as a force applied between the supports. This force is resisted by a box-girder construction, in which the bottom tank-sheet 1 and the lower portion of the tank-brace 19 form the tension element and the top portion of the brace 19 the compression element.

The design of the tank-brace may be varied in many ways. For example, the shape illustrated in Fig. 3 could be formed of a single sheet of metal $19^a$, as shown in Fig. 8.

In Fig. 9 two channels $19^b$ are spaced apart and riveted to the tank. Connecting-bars 22 are riveted to the top of these channels.

Fig. 10 illustrates a tank-brace composed of a U-shaped member $19^c$, riveted to the bottom of the tank and provided with a cover-plate $22^a$. Where this construction is used, the bottom tank-sheet could be made of lighter material, as the U-shaped member and its cover-plate form a complete box-girder.

The tank-brace shown in Fig. 11 is composed of an inverted-U-shaped member $19^d$, provided with flanges at the bottom, which are riveted to the tank.

I am aware that minor changes in the construction, arrangement, and combination of the several parts of my device can be made and substituted for those herein shown and described without departing from the nature and principle of my invention.

Having thus described my invention, what I claim as new, and desire to secure by Letters Patent, is—

1. A tank-car in which the buffing and pulling stresses are transmitted to and borne by a longitudinal box-girder located wholly within the liquid-compartment of the tank, the interior of said box-girder communicating with the tank; substantially as described.

2. A tank-car in which the buffing and pulling stresses are transmitted to and borne by an interiorly-arranged longitudinal tank-brace secured substantially throughout its length to the tank; substantially as described.

3. A tank-car in which the buffing and pulling stresses are transmitted to and borne by a tank-brace secured substantially throughout its length to the tank; substantially as described.

4. In a tank-car, the combination with a tank, of a longitudinal tank-brace arranged in the liquid-compartment of the tank and comprising members spaced apart and united with the bottom of the tank to form a box-girder; substantially as described.

5. In a tank-car, the combination with a tank, of a longitudinal tank-brace arranged in the liquid-compartment of the tank and comprising members spaced apart and united with the bottom of the tank to form a box-girder in which the bottom of the tank is a tension member; substantially as described.

6. In a tank-car, the combination with a tank, of a longitudinal sill located in the liquid-compartment of the tank and riveted throughout its length to the tank; substantially as described.

7. In a tank-car, the combination with a tank, of a longitudinal sill located in the liquid-compartment and riveted substantially throughout its length to the bottom of the tank; substantially as described.

8. In a tank-car, the combination with a tank, of a longitudinally-extending girder arranged in the liquid-compartment of said tank and riveted substantially throughout its length to said tank; substantially as described.

9. In a tank-car, the combination with a tank, of body-bolsters connected to an interiorly-arranged tank-brace; substantially as described.

10. In a tank-car, the combination with a tank, of an interiorly-arranged longitudinal tank-brace, and exteriorly-arranged body-bolsters riveted to said tank-brace; substantially as described.

11. In a tank-car, the combination with a tank, of body-bolsters and draft-sills secured under the ends of the tank and arranged to transmit the buffing and pulling stresses to an interiorly-arranged tank-brace located in a horizontal plane above the draft-sills; substantially as described.

12. In a tank-car, the combination with body-bolsters, of a tank provided with a bottom sheet which connects said body-bolsters; substantially as described.

13. In a tank-car, the combination with draft-sills, of a tank provided with a bottom sheet which connects said draft-sills; substantially as described.

14. In a tank-car, the combination with a tank, of exteriorly-arranged body-bolsters riveted to a bottom tank-sheet which connects said body-bolsters, and an interiorly-arranged tank-brace connecting the body-bolsters; substantially as described.

15. In a tank-car, the combination with a tank, of a longitudinal tank-brace riveted substantially throughout its length to the bottom of the tank and located within the liquid-compartment of the tank, and exteriorly-arranged draft-sills provided with a curved top portion arranged under and riveted to the tank, said draft-sills being connected to said interiorly-arranged brace; substantially as described.

16. In a tank-car, the combination with a tank, of frangible running-board brackets riveted to said tank; substantially as described.

17. In a tank-car, the combination with a tank, of chilled-cast-iron running-board brackets riveted to said tank; substantially as described.

18. In a tank-car, a stiffener arranged in the bottom of the tank, the interior of which stiffener communicates with the liquid-compartment of the tank, and a discharge leading from the interior of said stiffener.

19. In a tank-car, hollow means connected to the bottom of the tank and communicating with the liquid-compartment thereof, said hollow means transmitting the pulling and buffing strains, and a discharge leading from said hollow means for emptying the tank.

In testimony whereof I hereunto affix my signature, in the presence of two witnesses, this 2d day of November, 1906.

THOMAS R. BROWN.

Witnesses:
ROBT. G. JEFFERY,
EDW. D. HILLMAN.